(12) United States Patent
Thai

(10) Patent No.: US 9,986,042 B2
(45) Date of Patent: May 29, 2018

(54) ZERO CLIENT DEVICE WITH CACHED CONNECTIONS

(71) Applicant: NCS Technologies, Inc., Gainesville, VA (US)

(72) Inventor: Binh Kien Thai, Centreville, VA (US)

(73) Assignee: NCS Technologies, Inc., Gainesville, VA (US)

( * ) Notice: Subject to any disclaimer, the term of this patent is extended or adjusted under 35 U.S.C. 154(b) by 224 days.

(21) Appl. No.: 14/929,005

(22) Filed: Oct. 30, 2015

(65) Prior Publication Data

US 2016/0127477 A1 May 5, 2016

Related U.S. Application Data

(60) Provisional application No. 62/075,809, filed on Nov. 5, 2014.

(51) Int. Cl.
*G06F 15/16* (2006.01)
*H04L 29/08* (2006.01)
*H04L 29/06* (2006.01)

(52) U.S. Cl.
CPC .......... *H04L 67/147* (2013.01); *H04L 67/141* (2013.01); *H04L 69/16* (2013.01); *H04L 69/18* (2013.01)

(58) Field of Classification Search
CPC ....................................................... H04L 69/16
USPC ........................................................ 709/228
See application file for complete search history.

(56) References Cited

U.S. PATENT DOCUMENTS

| 7,430,755 B1 * | 9/2008 | Hughes | H04L 63/0823 726/3 |
| 8,645,556 B1 * | 2/2014 | Masters | H04L 67/1008 703/21 |
| 2006/0047836 A1 | 3/2006 | Rao | |
| 2007/0180449 A1 | 8/2007 | Croft | |
| 2008/0084867 A1 * | 4/2008 | Foti | H04N 7/17336 370/352 |
| 2009/0282099 A1 | 11/2009 | Romm | |
| 2010/0274848 A1 | 10/2010 | Altmaier | |
| 2011/0131308 A1 * | 6/2011 | Eriksson | H04L 67/14 709/223 |
| 2012/0131663 A1 * | 5/2012 | Anchan | H04L 29/12471 726/13 |
| 2012/0317177 A1 | 12/2012 | Husain | |
| 2015/0142982 A1 * | 5/2015 | Gonzales | H04L 65/1069 709/227 |

OTHER PUBLICATIONS

PCT International Search Report and Written Opinion for PCT/US2015/058482, dated Jan. 19, 2016.

* cited by examiner

*Primary Examiner* — Hamza N Algibhah
(74) *Attorney, Agent, or Firm* — Sheppard Muillin Richter & Hampton LLP

(57) ABSTRACT

Systems and methods for maintaining zero client sessions between different servers and a zero client device are presented herein.

16 Claims, 2 Drawing Sheets

ZERO CLIENT DEVICE WITH CACHED CONNECTIONS

FIELD OF THE DISCLOSURE

The present invention relates generally to zero client devices that maintain server connections when switching between different servers.

BACKGROUND

A zero client device typically comprises a functionally limited processing device that may connect to a server over a network. In some implementations, one or more servers may provide information processing and/or data persistence roles in a system comprising the servers and one or more zero client devices. A server may receive input data from the zero client devices and provide output data to the zero client devices. A given zero client device and server may initiate a connection by performing a "handshake," and/or other negotiation and/or authentication protocol. This process may set parameters of a communications channel established between the two. When communications are established, this may be referred to as a "session," "client session," and/or "zero client session." When a zero client device switches to a different server, the previous session is ended.

One or more user interface components (e.g., a monitor, a keyboard, a mouse, and/or other considerations) may be coupled to, or integrated with, a given zero client device. A zero client device may mimic a conventional computer system (often referred to as a "fat client"); however, it may benefit from the reduced need for local, and typically expensive, processing hardware.

SUMMARY

In some implementations, a zero client device and a server may maintain a session by periodically sending back and forth a type of signal called "keep-alive" signals. These signals may inform the zero client device and/or the server that the device at the other end of the connection is still active and/or that each party should continue to maintain the session on its end. If the periodic handshaking of the keep-alive signals is disrupted for some reason and one party fails to receive the keep-alive signals or the acknowledgment of its keep-alive signals from the other party, one or both of the zero client device or server may assume that the other party has been offline, and it may terminate the connection on its end.

In some implementations, while the zero client device is in a session with a server, if the user wants to connect to a different server, the zero client device will terminate the current session and establish a new connection to the other server. When the user wants to connect to the previous server again, the negotiation and/or authentication process must be repeated because the zero client device would treat the connection as a new connection/session. As a result, the zero client device would have to go through a complete process, including the execution of a negotiation and/or authentication protocol with the server, every time it wants to establish a zero client session. Since a zero client device may be designed not to store any sensitive data locally, this means the user might have to re-enter the credential for the authentication protocol every time he/she connects to a server. This may cause productivity problems in cases where a user has to switch back and forth between different zero client sessions frequently.

One or more aspects of the disclosure relate to a system for maintaining previously established zero client sessions between a zero client device and one or more servers. In some implementations, when a zero client device establishes a connection to a new server, the zero client device may be configured to simultaneously maintain the connection with the previous server by continuing to send the keep-alive signals and/or the acknowledgement of those signals to the previous server. During this period, the zero client device may discard the output data (e.g., audio/video data, and/or other considerations) that it receives from the previous server. During this period, the zero client device may accept only the output data from the current server. When the user wants to switch back to the session with the previous server, the zero client device may simply discard the output data from the current server and discontinue discarding the output data from the previous server. In this way, the zero client device may not have to negotiate a connection with the previous server, and the user does not have to go through an authentication process again.

A zero client device may comprise one or more physical processors configured to execute one or more computer program components. The computer program components may include a communications component, a transcoding component, a cache component, and/or other components. In some implementations, the computer program components may be housed in the same physical processor.

The communications component may be configured to receive information from, and/or communicate information to, one or more of the transcoding component, the cache component, one or more servers, and/or other components. The communications component may be configured to initiate one or more zero client sessions with one or more servers and/or or other network-accessible devices over a network, such as the Internet. The communications component may be configured to periodically transmit keep-alive signals to a server and/or receive acknowledgment signals from a server during a zero client session, and/or other considerations.

The communications component may be configured to receive input data from the transcoding component. The communications component may be configured to effectuate transmission of the input data over the network to a server. The communications component may be configured to receive output data from a server over the network and send the output data to the transcoding component.

In some embodiments, the transcoding component may be configured to facilitate one or more of receiving input data from one or more interface devices coupled to or integrated with the zero client device, encoding the input data, providing the encoded input data to the communications component for transmission over the network to the server, and/or other considerations. The transcoding component may be further configured to receive the output data from the communications component, decode the output data, and send the decoded output data to at least one of the one or more interface devices.

The cache component may be configured to, responsive to receiving a request (e.g, user request, and/or other considerations) to establish a new session with a new server, continue to effectuate transmission of the keep-alive signals to the previous server and/or receive the acknowledgement of those signals from the previous server, and/or other considerations. In some implementations, the cache component may be configured to effectuate transmission of the keep-alive signals and/or receive the acknowledgement signals via the communications component, independently of the communications component (e.g., the signals may be routed away from the communications component to the cache component, and/or other considerations), and/or other considerations. During this period, the cache component may be configured to discard the output data (e.g., audio/video data, and/or other considerations) that is sent from the previous server. In some implementations, when a session is to be re-joined, the cache component may be configured to discontinue discarding the output data that is sent from the previous server, such that the communications component may once again receive the output data.

In some implementations, once the keep-alive signals and/or acknowledgement signals of a previous session are maintained by the cache component, the session may be referred to as a "cached session," and/or other considerations.

In some implementations, one or more sessions (e.g., including both cached and active sessions) may share the same networking channel/medium, e.g. a common RJ-45 port, wireless access point, and/or other channel/medium that the zero client device may be coupled with. In some implementations, for security reasons, each session may be established and/or cached using a separate networking channel/medium, and/or other considerations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
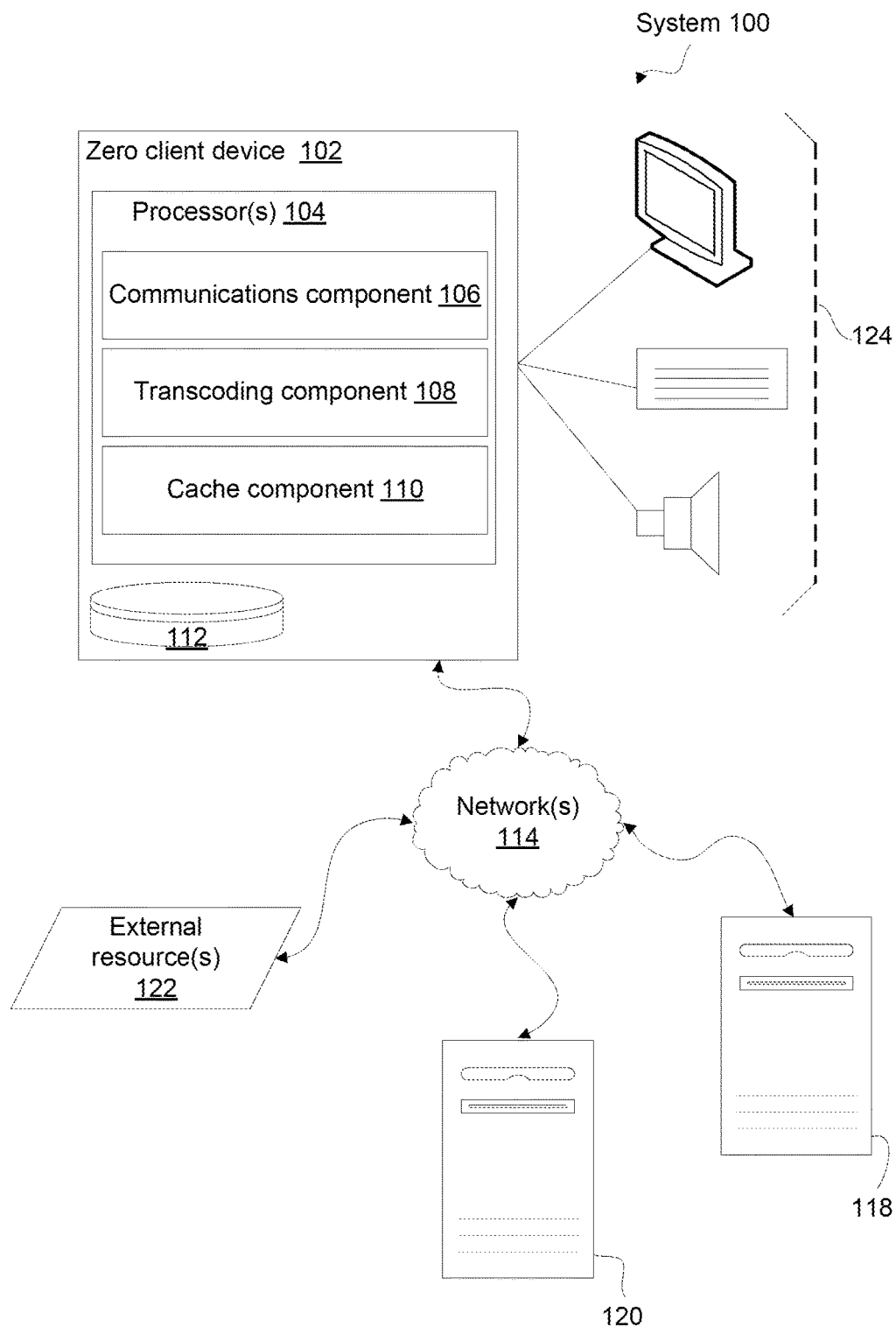
FIG. 1 illustrates a system for maintaining previously established zero client sessions between one or more zero client devices and one or more servers.

FIG. 1 illustrates a system 100 for maintaining previously established zero client sessions between a zero client device and one or more servers. Zero client device 102 may comprise one or more physical processors 104 configured to execute one or more computer program components. The computer program components may include a communications component 106, a transcoding component 108, a cache component 110, and/or other components. The zero client device 102 may include one or more user interface devices 124. The user interface devices 124 may be coupled to or integrated with the zero client device 102. The user interface devices 124 may include one or more of a monitor, a keyboard, a mouse, a speaker (or other audio output device), and/or other components.

The communications component 106 may be configured to facilitate information exchanges with one or more of a first server 118, a second server 120, other servers, external resource(s) 122, and/or other components of the system 100. The communications component 106 may be configured to receive information from, and/or communicate information to the transcoding component 108, the cache component 110, and/or other components within processor 104.

In some implementations, the communications component 106 may be configured to initiate and/or otherwise establish one or more zero client sessions with one or more of the servers (e.g., servers 118 and/or 120), and/or or other network-accessible devices over network 114, such as the Internet. The communications component 106 may be configured to effectuate a "handshake" process with a server and/or may carry out one or more other negotiations and/or authentication protocols. This process may set parameters of a communications channel that may be established between the zero client device 102 and a server. Handshaking may be used to negotiate parameters that may be acceptable to the zero client device 102 and/or end server, including, but not limited to, information transfer rate, coding alphabet, parity, interrupt procedure, and/or other protocol and/or hardware features. Exemplary protocols may include one or more of Transport Layer Security (TSL) Handshake Protocol, Transmission Control Protocol (TCP), User Datagram Protocol (UDP), and/or other communications protocols. When negotiations are completed and/or authorized, a "session" may be established. The sessions may be referred to as one or more of a "client session," a "zero client session," and/or other considerations.

During a communication session, the communications component 106 may be configured to periodically transmit keep-alive signals, messages, and/or other session maintenance signals to a server and/or receive acknowledgment signals from a server during the session, and/or other considerations. The session maintenance signals may be associated with one or more of a keep-alive time, a keep-alive interval, a keep-alive retry, and/or other considerations.

This periodic sending of session maintenance signals by the zero client device may indicate to the server that the connection should be preserved. Absent such a signal, one or both of the zero client device 102 and/or server (e.g., one or both of servers 118 and 120) may drop and/or end the connection. In some implementations, the connection may be ended after a timeout period during which no such signals have been received.

By way of non-limiting illustration, the communications component 106 may be configured to establish a first communication session with the server 118 based on successful negotiation and/or authentication of parameters of the first communication session. The first communication session may be associated with periodic transmission of first session maintenance messages from the communications component 106 to the server 118. The first session maintenance messages may comprise one or more of keep-alive signals, acknowledgements of keep-alive signals sent from the server 118, and/or other information.

In some implementations, the communications component 106 may be configured to receive input data from the transcoding component 108. By way of non-limiting example, the communications component 106 may be configured to receive first input data from the transcoding component 108.

In some implementations, the communications component 106 may be configured to effectuate transmission of received input data over the network 114 to a server. By way of non-limiting example, the communications component 106 may be configured to effectuate transmission of the first input data to server 118 over network 114. The transmission of the first input data to server 118 may be in accordance with the established first communication session.

In some implementations, the communications component 106 may be configured to receive output data from one or more servers. The output data may include information gathered, generated, and/or otherwise determined at a server, based on the received input data. For example, the server may process the input data and return the output data as a result. The output data may be communicated to the communications component 106 over the network 114. The communications component 106 may be configured to send the output data to the transcoding component 108.

By way of non-limiting illustration, the communications component 106 may be configured to receive first output data from server 118 over network 114. The first output data may be received in accordance with the first communication session, and/or other considerations. The first output data may be a result of processing by server 118 of the first input data. The communications component 106 may be configured to send the first output data and/or other information to the transcoding component 108.

In some implementations, the transcoding component 108 may be configured to facilitate one or more of receiving input data from one or more interface devices 124, encoding the input data, providing the encoded input data to the communications component 106 for transmission to the server, and/or other considerations. In some implementations, input data received from one or more of the interface devices 124 may include entry and/or selection by the user of a request to establish a session with server 120. The transcoding component 108 may be further configured to receive the output data from the communications component 106, decode the output data, and/or transmit the decoded output data to at least one of the one or more interface devices 124.

By way of non-limiting illustration, the transcoding component 108 may be configured to receive the first input data from one or more of the interface devices 124. The transcoding component 108 may be configured to encode the first input data for transmission to the server 118 via communications component 106. For example, encoding may include one or more of direct analog-to-analog conversation, digital-to-digital conversion, character encoding, bridging/emulation of peripheral device communication (e.g., USB), and/or other considerations.

The transcoding component 108 may be configured to receive the first output data from the communications component 106. The transcoding component 108 may be configured to decode the first output data. The transcoding component 108 may be configured to effectuate transmission of the decoded first output data to at least one of the one or more interface devices 124.

The cache component 110 may be configured to, responsive to receiving a request (e.g., via transcoding component 108) to establish a new session with a new server, continue to effectuate communication of session maintenance signals associated with the previous server, and/or other considerations. In some implementations, the cache component 110 may be configured to effectuate transmission of the keep-alive signals and/or receive the acknowledgement signals via the communications component 106, independently of the communications component 106 (e.g., the signals may be routed away from the communications component 106 to the cache component 110, and/or other considerations), and/or other considerations.

During this period, the cache component 110 may be configured to discard the output data (e.g., audio/video data, and/or other considerations) that is sent from the previous server. In some implementations, when a cached session is to be re-activated, the cache component 110 may be configured to discontinue discarding the output data that is sent from the previous server, such that the communications component 106 may once again receive the output data.

The communications component 106 may be configured to, responsive to receiving the request (e.g., via transcoding component 108) to establish a new session with a new server, effectuate a handshaking protocol with the new server to negotiate parameters of the new session. Once a session is established (e.g., negotiated and/or authorized), the communications component 106 may be configured to maintain the new session by effectuating communication of session maintenance signals with the new server.

By way of non-limiting illustration, the cache component 110 may be configured to, responsive to receiving a request to establish a second communication session with server 120, continue to effectuate transmission of the first session maintenance messages to the server 118 while discarding the output data received from the server 118. The first communication session may be a cached session. The communications component 106 may be configured to establish the second communication session with server 120. The communications component 106 may be configured to receive output data from the server 120.

In some implementations, the transcoding component 108 may be configured to receive a request to re-join the first communication session. Responsive to this request, the communications component 106 may be configured to end the second communication session, cache the second communication session (e.g., via cache component 110), and/or other considerations. The cache component 110 may be configured to discontinue discarding the first output data that is sent from the server 118, such that the communications component 106 may once again receive the output data in accordance with the first communication session. The first communication session may then be re-joined without the need to renegotiate and/or authorize the parameters of the session.

It is noted that, although the above description is directed to switching between first and second communication sessions, in other implementations, the cache component 110 may be configured to facilitate switching among sessions established with many servers. This may mean caching one or more zero client sessions at a time.

In FIG. 1, the servers 118 and 120, zero client device 102, and/or external resources 122 may be operatively linked via one or more electronic communication links. For example, such electronic communication links may be established, at least in part, via a network 114 such as the Internet and/or other networks. It will be appreciated that this is not intended to be limiting, and that the scope of this disclosure includes implementations in which servers 118 and 120, zero client device 102, and/or external resources 122 may be operatively linked via some other communication media.

The external resources 122 may include sources of information, hosts and/or providers of information outside of system 100, external entities participating with system 100, and/or other resources. In some implementations, some or all of the functionality attributed herein to external resources 122 may be provided by resources included in system 100 (e.g., in one or more servers 118 and/or 120).

The zero client device 102 may include electronic storage 112, one or more processors 104, and/or other components.

The zero client device 102 may include communication lines or ports to enable the exchange of information with a network and/or other computing platforms. Illustration of zero client device 102 in FIG. 1 is not intended to be limiting. The zero client device 102 may include a plurality of hardware, software, and/or firmware components operating together to provide the functionality attributed herein to zero client device 102.

Electronic storage 112 may comprise electronic storage media that electronically stores information. The electronic storage media of electronic storage 112 may include one or both of system storage that is provided integrally (i.e., substantially non-removable) with zero client device 102 and/or removable storage that is removably connectable to zero client device 102 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 112 may include one or more virtual storage resources (e.g., cloud storage, a virtual private network, and/or other virtual storage resources). Electronic storage 112 may store software algorithms, information determined by processor 104, information received from servers 118 and 120, and/or other information that enables zero client device 102 to function as described herein.

Processor(s) 104 is configured to provide information processing capabilities in zero client device 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more components. These components may be physically located within the same device, or processor 104 may represent processing functionality of a plurality of devices operating in coordination. The processor 104 may be configured to execute components 106, 108, and/or 110. Processor 104 may be configured to execute components 106, 108, and/or 110 by software; hardware; firmware; some combination of software, hardware, and/or firmware; and/or other mechanisms for configuring processing capabilities on processor 104.

It should be appreciated that, although components 106, 108, and/or 110 are illustrated in FIG. 1 as being co-located within a single component, in implementations in which processor 104 includes multiple components, one or more of components 106, 108, and/or 110 may be located remotely from the other components. The description of the functionality provided by the different components 106, 108, and/or 110 described above is for illustrative purposes and is not intended to be limiting, as any of components 106, 108, and/or 110 may provide more or less functionality than is described. For example, one or more of components 106, 108, and/or 110 may be eliminated, and some or all of its functionality may be provided by other ones of components 106, 108, 110, and/or other components. As another example, processor 104 may be configured to execute one or more additional components that may perform some or all of the functionality attributed below to one of components 106, 108, and/or 110.

Figure 2:
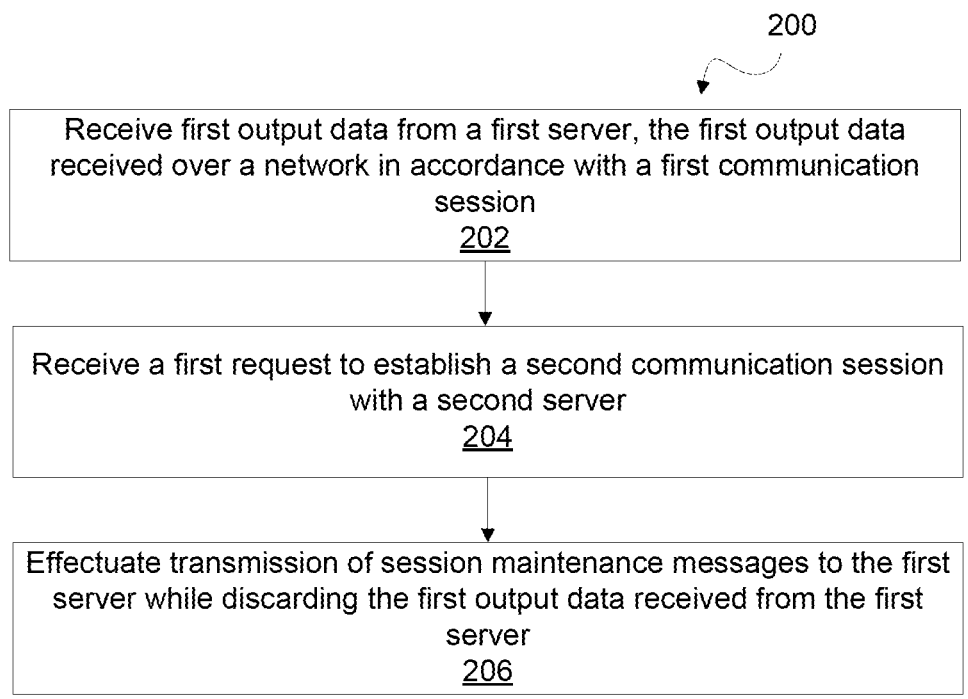
FIG. 2 illustrates a method of maintaining previously established zero client sessions between one or more zero client devices and one or more servers.

FIG. 2 illustrates a method 200 of maintaining zero client sessions between a zero client device and one or more servers. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, a functionally limited processing device, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Referring now to method 200 in FIG. 2, at an operation 202, first output data from a first server may be received. The first output data may be received in accordance with a first communication session. In some implementations, operation 202 may be performed by a communications component the same as or similar to communications component 106 (shown in FIG. 1 and described herein).

At an operation 204, a first request to establish a second communication session with a second server may be received. In some implementations, operation 204 may be performed by a transcoding component the same as or similar to the transcoding component 108 (shown in FIG. 1 and described herein).

At an operation 206, transmission of session maintenance messages to the first server may be effectuated while discarding the first output data received from the first server. In some implementations, operation 206 may be performed by a cache component the same as or similar to the cache component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for maintaining communication sessions between a client device and one or more servers, the system comprising:
   one or more physical processors configured to:
      establish a first communication session with a first server;
      receive output data from the first server, the output data received over a network in accordance with the first communication session;

receive a request to establish a second communication session with a second server; and responsive to receiving the request to establish the second communication session, effectuate transmission of session maintenance messages to the first server while discarding the output data received from the first server to keep the first communication session with the first server alive.

2. The system of claim 1, wherein the one or more physical processors are configured such that the first communication session is associated with periodic transmission of first session maintenance messages from the one or more physical processors to the first server, and wherein effectuating transmission of the session maintenance messages to the first server while discarding the output data received from the first server comprises continuing to effectuate transmission of the first session maintenance messages from the one or more physical processors to the first server.

3. The system of claim 1, wherein the one or more physical processors are further configured to:

establish the second communication session with the second server, while continuing to maintain the first communication session with the first server.

4. The system of claim 3, wherein the one or more physical processors are configured such that establishing the second communication session comprises carrying out a handshaking protocol between the one or more physical processors and the second server.

5. The system of claim 1, wherein the one or more physical processors are further configured to:

receive a request to restore the first communication session; and responsive to receiving the request to restore the first communication session, discontinue discarding the output data received from the first server to reactivate the first communication session.

6. The system of claim 5, wherein the one or more physical processors are configured such that, responsive to receiving the request to restore the first communication session, the second communication session is ended.

7. The system of claim 1, wherein the one or more physical processors comprise a functionally limited processing device.

8. The system of claim 5, wherein the one or more physical processors are configured such that, responsive to receiving the request to restore the first communication session, the second communication session is kept alive by transmission of the session maintenance messages to the second server while discarding output data received from the second server.

9. A method of maintaining communication sessions between a client device and one or more servers, the method being implemented in a computer system including one or more physical processors and storage media storing machine-readable instructions, the method comprising:

establishing a first communication session with a first server;

receiving output data from the first server, the output data received over a network in accordance with the first communication session; and receiving a request to establish a second communication session with a second server; and responsive to receiving the request to establish the second communication session, effectuating transmission of session maintenance messages to the first server while discarding the output data received from the first server to keep the first communication session with the first server alive.

10. The method of claim 9, wherein the first communication session is associated with periodic transmission of first session maintenance messages from the one or more physical processors to the first server, and wherein effectuating transmission of the session maintenance messages to the first server while discarding the output data received from the first server comprises continuing to effectuate transmission of the first session maintenance messages from the one or more physical processors to the first server.

11. The method of claim 9, additionally comprising:

establishing the second communication session with the second server, while continuing to maintain the first communication session with the first server.

12. The method of claim 11, wherein establishing the second communication session comprises carrying out a handshaking protocol between the one or more physical processors and the second server.

13. The method of claim 9, additionally comprising:

receiving a request to restore the first communication session; and responsive to receiving the request to restore the first communication session, discontinuing to discard the output data received from the first server to reactivate the first communication session.

14. The method of claim 13, such that, responsive to receiving the request to restore the first communication session, the second communication session is ended.

15. The method of claim 9, wherein the computer system comprises a functionally limited processing device.

16. The method of claim 13, such that, responsive to receiving the request to restore the first communication session, the second communication session is kept alive by transmission of the session maintenance messages to the second server while discarding output data received from the second server.

* * * * *